(12) United States Patent
Tanabe et al.

(10) Patent No.: US 8,417,063 B2
(45) Date of Patent: Apr. 9, 2013

(54) IMAGE PROCESSING APPARATUS AND IMAGE PROCESSING SYSTEM

(75) Inventors: Yasuki Tanabe, Ichikawa (JP); Takashi Miyamori, Yokohama (JP); Yasukazu Okamoto, Akashi (JP); Tsuyoshi Nakano, Kawasaki (JP); Katsuyuki Kimura, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 205 days.

(21) Appl. No.: 13/052,770

(22) Filed: Mar. 21, 2011

(65) Prior Publication Data
US 2012/0183207 A1 Jul. 19, 2012

(30) Foreign Application Priority Data
Jan. 19, 2011 (JP) ................................. 2011-008470

(51) Int. Cl.
*G06K 9/32* (2006.01)
*H04N 1/40* (2006.01)

(52) U.S. Cl.
USPC .......................................... 382/296; 358/448

(58) Field of Classification Search .................. 382/162, 382/235, 276, 296; 348/211.14, 222.1, 474, 348/571; 358/3.23, 448
See application file for complete search history.

(56) References Cited

U.S. PATENT DOCUMENTS
6,081,625 A * 6/2000 Sakaue .......................... 382/254

FOREIGN PATENT DOCUMENTS
| JP | H06-012489 | 1/1994 |
| JP | 2000-293678 | 10/2000 |
| JP | 2006-259875 | 9/2006 |

OTHER PUBLICATIONS
Explanation of Non-English References.

* cited by examiner

*Primary Examiner* — Abolfazl Tabatabai
(74) *Attorney, Agent, or Firm* — Knobbe Martens Olson & Bear LLP (57) ABSTRACT

According to one embodiment, an image processing apparatus connected to an external memory and a cache memory. The apparatus includes a counter, a coordinate calculator, a tag checker, a pixel referring module, a pixel value calculator and an outputting module. The counter determines a converted coordinate according to a predetermined execution sequence. The coordinate calculator calculates a unconverted coordinate used to calculate a converted pixel value located at the converted coordinate. The tag checker generates a conversion request to calculate the converted pixel value with reference to an unconverted pixel located at the unconverted coordinate. The pixel referring module reads the unconverted pixel from the cache memory based on the conversion request when the unconverted pixel is stored in the cache memory. The pixel value calculator calculates the converted pixel value with reference to the read unconverted pixel. The outputting module writes the converted pixel having the calculated converted pixel value into the external memory.

20 Claims, 13 Drawing Sheets

IMAGE PROCESSING APPARATUS AND IMAGE PROCESSING SYSTEM

CROSS REFERENCE TO RELATED APPLICATIONS

This application is based upon and claims the benefit of priority from the prior Japanese Patent Application No. 2011-8470, filed on Jan. 19, 2011, the entire contents of which are incorporated herein by reference.

FIELD

Embodiments described herein relate generally to an image processing apparatus and an image processing system.

BACKGROUND

A general image processing apparatus that converts an image calculates a converted pixel value of a converted pixel located at a converted coordinate in a converted image by referring to a unconverted pixel value of a unconverted pixel located at an unconverted coordinate corresponding to the converted coordinate of unconverted coordinates in an unconverted image before a conversion.

A conventional image processing apparatus is connected to an external memory and includes a cache memory. Image data is stored in the external memory. The image processing apparatus refers to the unconverted pixel in the external memory, calculates the converted pixel value, and writes the calculated converted pixel into the external memory. In order to decrease the number of access times to the external memory, the image processing apparatus confirms whether the unconverted pixel is stored in the cache memory when referring to the unconverted pixel value. When the unconverted pixel is stored in the cache memory, the image processing apparatus calculates the converted pixel value using the unconverted pixel value of the unconverted pixel stored in the cache memory. When the unconverted pixel is not stored in the cache memory, the image processing apparatus reads the unconverted image from the external memory. The read unconverted image includes the unconverted pixel to be referred and the peripheral pixel located around the unconverted pixel.

However, depending on an image conversion pattern, only part of the unconverted pixel stored in the cache memory is referred to in calculating the converted pixel value, which reduces use efficiency of the cache memory.

On the other hand, when the unconverted pixel necessary to calculate the converted pixel value is not stored in the cache memory, a fetch request to transfer the unconverted pixel stored in the external memory to the cache memory is issued, which results in a problem in that latency of access to the external memory increases.

DETAILED DESCRIPTION

Embodiments will now be explained with reference to the accompanying drawings.

In general, according to one embodiment, According to one embodiment, an image processing apparatus connected to an external memory and a cache memory. The apparatus includes a counter, a coordinate calculator, a tag checker, a pixel referring module, a pixel value calculator and an outputting module. The counter determines a converted coordinate according to a predetermined execution sequence. The coordinate calculator calculates a unconverted coordinate used to calculate a converted pixel value located at the converted coordinate. The tag checker generates a conversion request to calculate the converted pixel value with reference to an unconverted pixel located at the unconverted coordinate. The pixel referring module reads the unconverted pixel from the cache memory based on the conversion request when the unconverted pixel is stored in the cache memory. The pixel value calculator calculates the converted pixel value with reference to the read unconverted pixel. The outputting module writes the converted pixel having the calculated converted pixel value into the external memory.

DETAILED DESCRIPTION OF THE INVENTION

Figure 1:
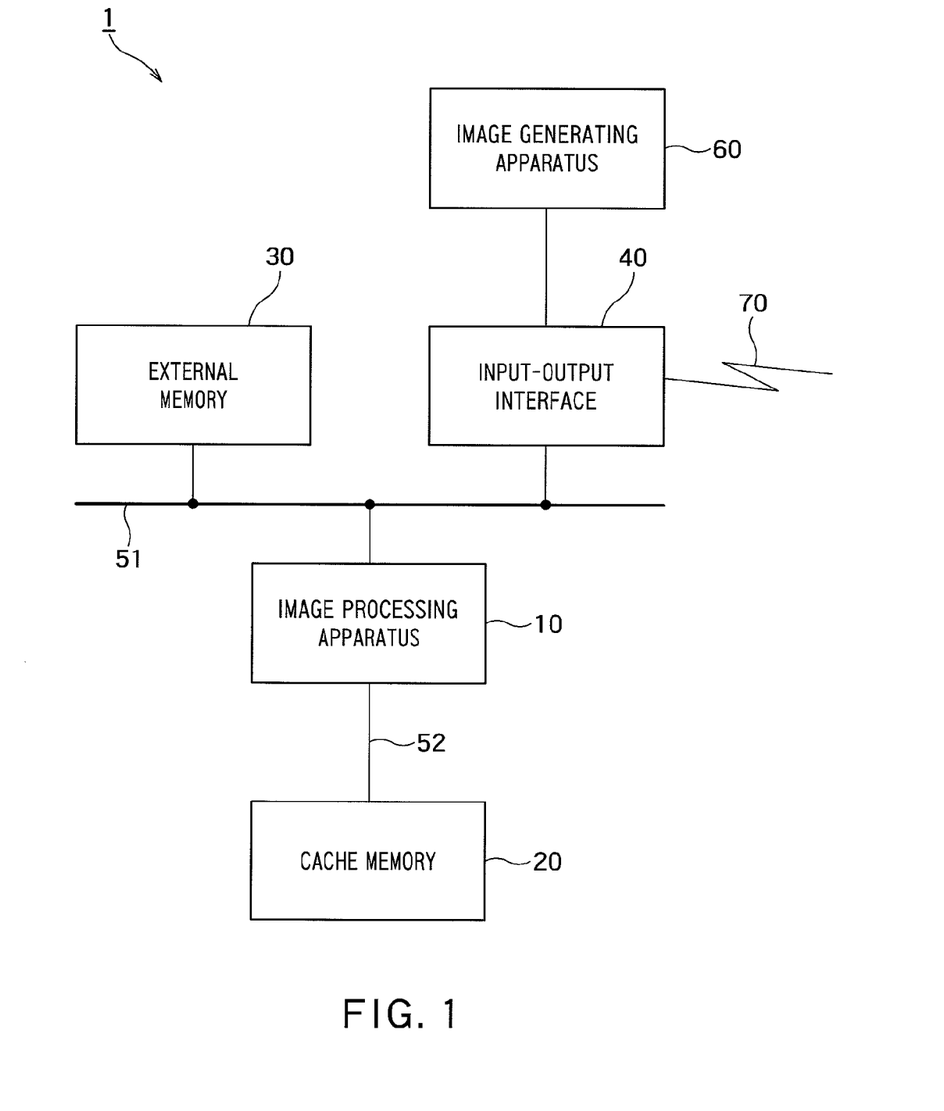
FIG. 1 is a block diagram illustrating a configuration of an image processing system 1 of an embodiment.
Figure 2:
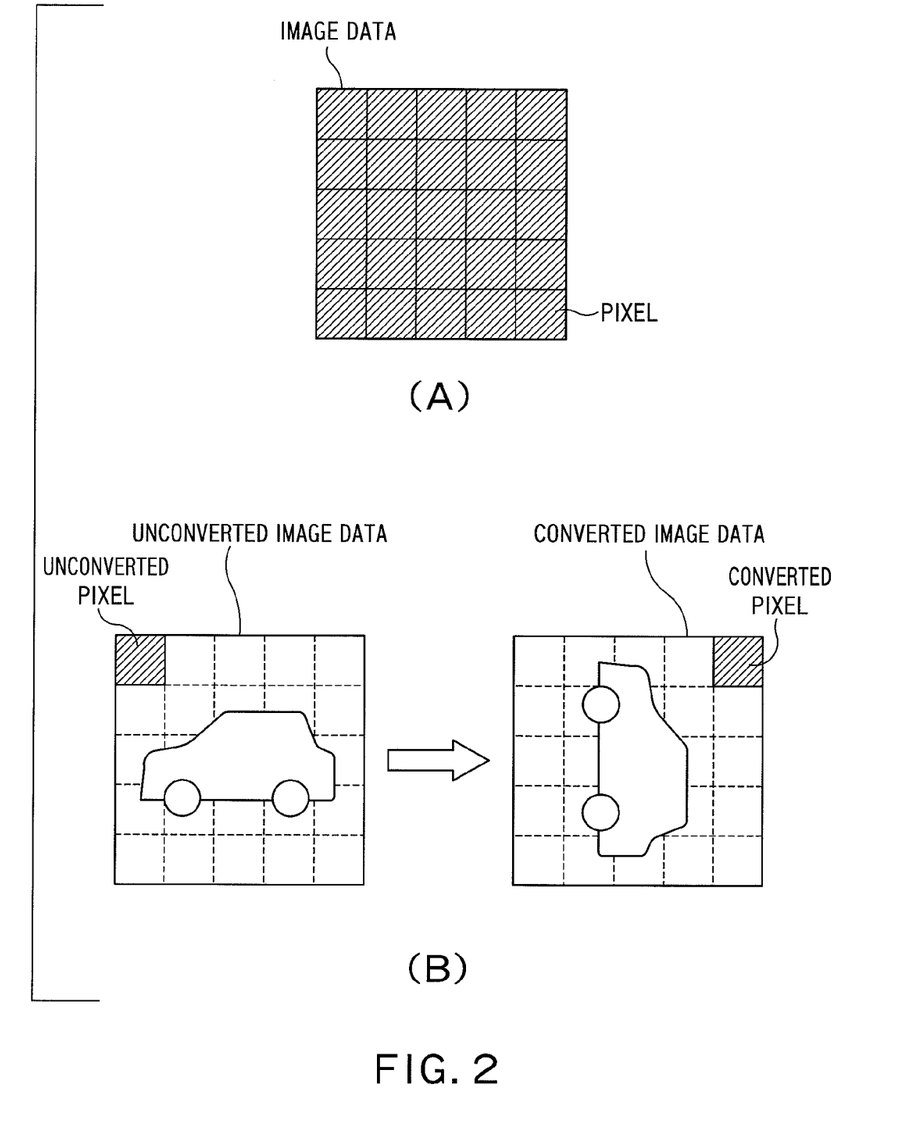
FIGS. 2A and 2B are schematic diagrams illustrating a data structure of image data of the embodiment.

Hereafter, an image processing system according to the embodiment will be explained more specifically with reference to the drawings. FIG. 1 is a block diagram illustrating a configuration of an image processing system 1 of an embodiment. FIG. 2 is a schematic diagram illustrating a data structure of image data of the embodiment.

The image processing system 1 of FIG. 1 includes an image processing apparatus 10, a cache memory 20, an external memory 30, an input-output interface 40, an external bus 51, an internal bus 52, an image generating apparatus 60, and a network 70. The image processing apparatus 10 is a semiconductor integrated circuit that executes predetermined image processing to the image data having plural pixels. The image processing apparatus 10 is connected to the external memory 30 and the input-output interface 40 through the external bus 51, and connected to the cache memory 20 through the internal bus 52. A conversion pattern is determined by a user who uses the image generating apparatus 60 or an application that implements a function of the image generating apparatus 60. The cache memory 20 is a module in which the unconverted pixel is stored in cache line unit. The external memory 30 is a module in which the image data is stored. The input-output interface 40 is connected to the image generating apparatus 60 and the network 70. The image generating apparatus 60 is a semiconductor integrated circuit (for example, in-vehicle camera) that generates the image data. For example, the network 70 is a wired network or a wireless network.

The image data includes plural pixels having pixel values. The pixel value is color information (for example, information expressing hue and gradation) on the pixel. The image processing is a processing of converting an image shape based on a predetermined conversion pattern (for example, rotation, flip horizontal, flip vertical, enlargement, reduction, and distortion compensation) (see FIG. 2B). FIG. 2B illustrates a conversion pattern in which unconverted image data is rotated clockwise by 90°. In the converted image data, a position (unconverted coordinate) of the unconverted pixel is changed into a position (converted coordinate) of the converted pixel.

Figure 3:
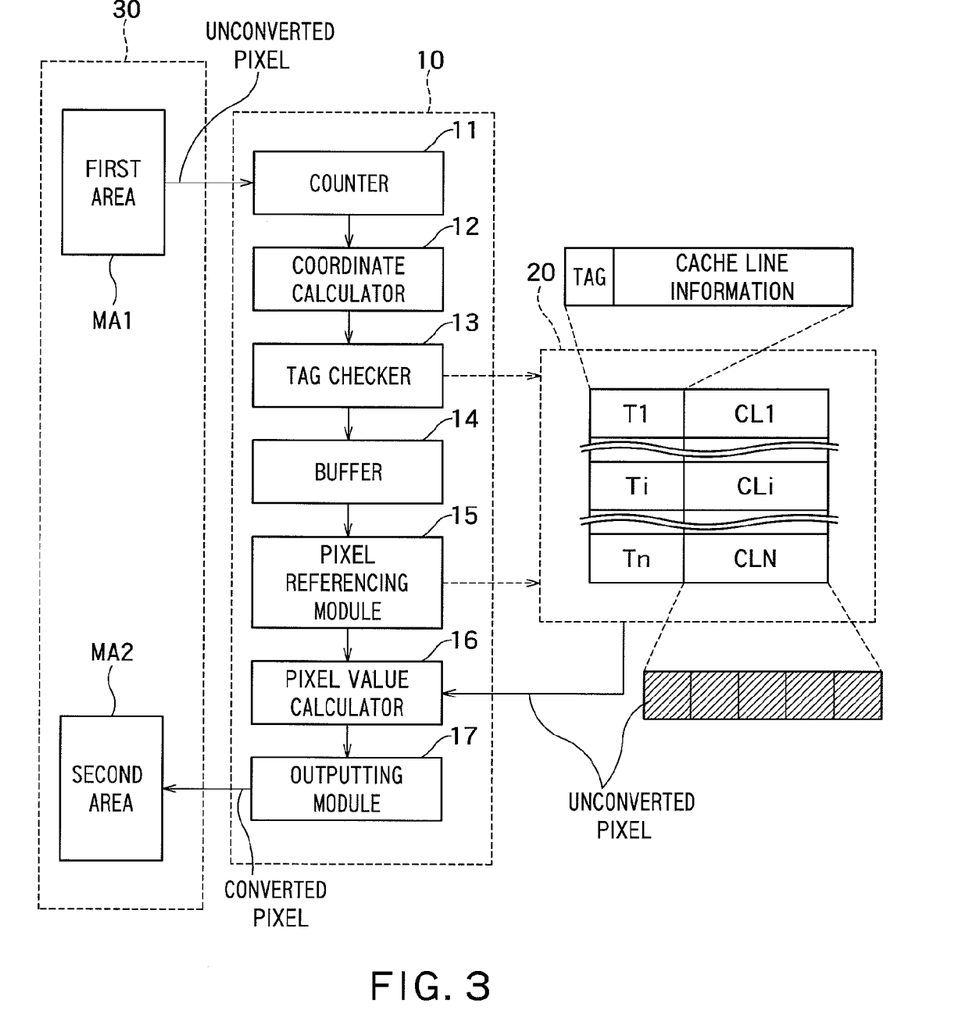
FIG. 3 is a block diagram illustrating a configuration of the image processing apparatus 10 of the embodiment.

A configuration of the image processing apparatus of the embodiment will be explained. FIG. 3 is a block diagram illustrating a configuration of the image processing apparatus 10 of the embodiment. The image processing apparatus 10 includes a counter 11, a coordinate calculator 12, a tag checker 13, a buffer 14, a pixel referring module 15, a pixel value calculator 16, and an outputting module 17. The cache memory 20 includes plural cache lines CLi (i=1 to n (n is an integer of 2 or more)) and plural tag areas Ti. Each cache line CLi is an area in which the unconverted pixels having a size that is the same as a cache line size of the cache line is stored. Each tag area Ti is an area in which a tag and cache line information are stored, and the tag area Ti is correlated with each cache line CLi. The tag is information specifying the unconverted pixel stored in the cache line CLi. The cache line information expresses a state of the cache line CLi. For example, the cache line information expresses whether the cache line CLi is being fetched and whether the unconverted pixel stored in the cache line CLi is valid. The external memory 30 includes a first area MA1 in which unconverted image data is stored and a second area MA2 in which converted image data is stored.

The counter 11 is a module that determines the converted coordinate. The converted coordinate corresponds to an address of the second area MA2 on one-on-one level. The coordinate calculator 12 is a module that calculates the unconverted coordinate. The unconverted coordinate corresponds to an address of the first area MA1 on one-on-one level. The tag checker 13 is a module that checks the tag area Ti to write a conversion request in the buffer 14. The conversion request is a data that requests to refer to the unconverted pixel to calculate the converted pixel value. The buffer 14 is a module that temporally stores the conversion request. The pixel referring module 15 is a module that checks the tag area Ti to read the unconverted pixel stored in the corresponding cache line CLi from the cache memory 20. The pixel value calculator 16 is a module that calculates the converted pixel value. The outputting module 17 is a module that writes the converted pixel into the second area MA2.

Figure 4:
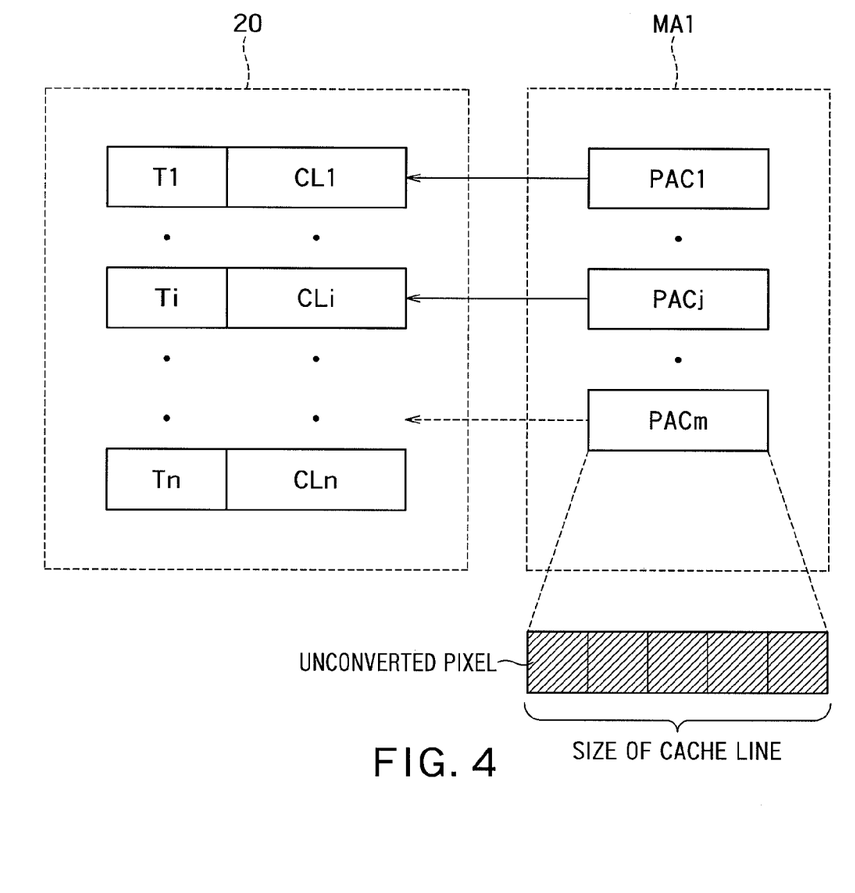
FIG. 4 is a schematic diagram illustrating the unconverted pixel stored in the cache line CLi of the embodiment.

The unconverted pixel stored in the cache line of the embodiment will be explained. FIG. 4 is a schematic diagram illustrating the unconverted pixel stored in the cache line CLi of the embodiment. The unconverted pixels (hereinafter referred to as "pixel package PACj (j=1 to m (m is an integer of 2 or more))") having the size that is the same as the cache line size is stored in the first area MA1. The unconverted pixels are arranged in the order of raster scan in each pixel package PACj. When the image processing apparatus 10 issues the fetch request, the pixel package PACj is transferred from the first area MA1 to the cache line CLi. When the pixel package PACj is stored in the cache line CLi, the tag (for example, value of "j") specifying the pixel package PACj is stored in the tag area Ti.

When the number of cache lines n is lower than the number of pixel packages m, the plural pixel packages PACj can be stored in the one cache line CLi. For example, in the case of "n=5" and "m=10", one of the pixel packages PAC1 and PAC6 is stored in the cache line CL1, and one of the pixel packages PAC2 and PAC7 is stored in the cache line CL2. That is, the two kinds of the pixel packages can be stored in the one cache line CLi.

First Embodiment

A first embodiment will be explained below. In the first embodiment, by way of example, the unconverted pixel that is referred to in calculating the converted pixel value is stored in the cache memory before the converted pixel value is computed.

Figure 5:
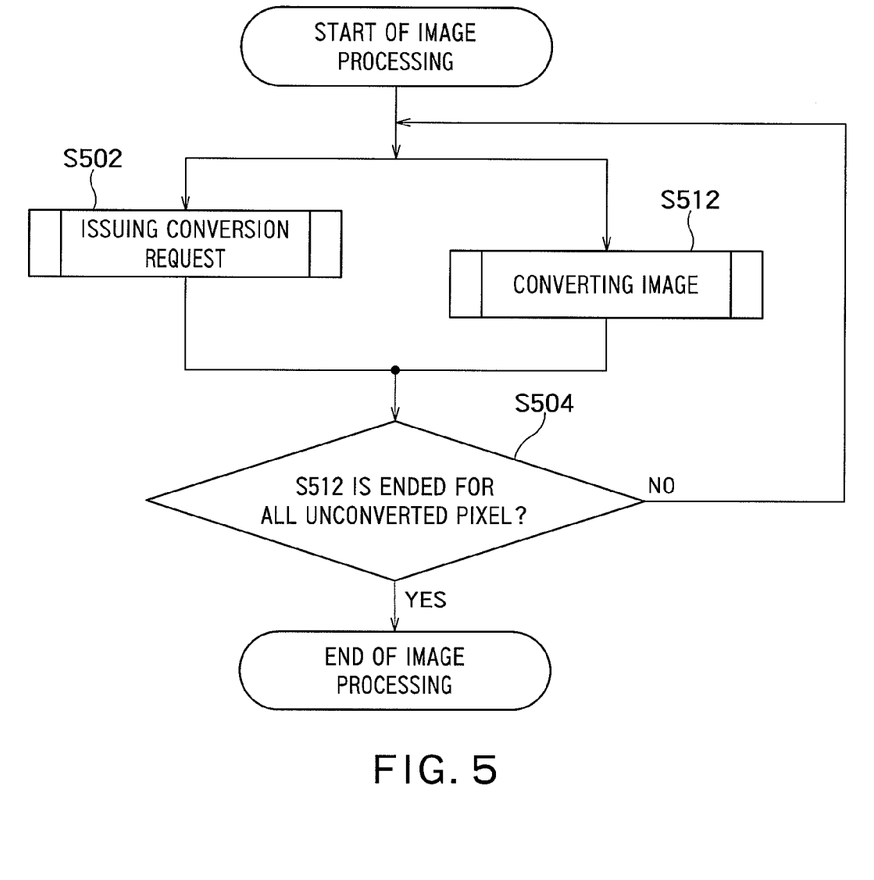
FIG. 5 is a flowchart illustrating a procedure of image processing of the first embodiment.

An operation of an image processing apparatus of the first embodiment will be explained. FIG. 5 is a flowchart illustrating a procedure of image processing of the first embodiment. The image processing apparatus 10 executes issuing conversion request (S502) and converting image (S512) in parallel. The pixel processed in S502 is prior to that in S512 by the predetermined number of pixels. The predetermined number of pixels is substantially equal to the number of pixels stored in one cache line. However, there is no limitation to the predetermined number of pixels, but the predetermined number of pixels is one pixel to k (k is the number of pixels that can be stored in the buffer 14) pixels. S502 and S512 are repeatedly executed until S512 is completed for all the unconverted pixels (NO in S504). When S512 is completed for all the unconverted pixels (YES in S504), the image processing is ended.

Figure 6:
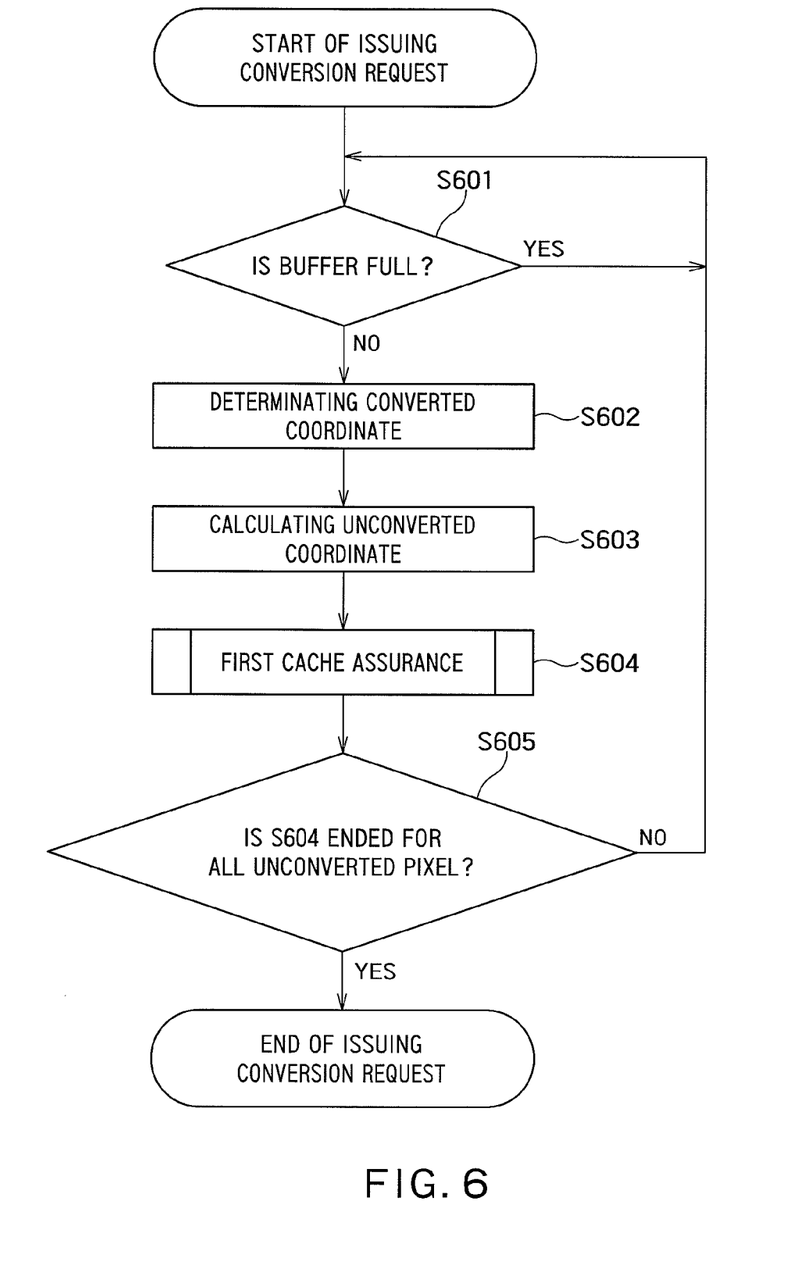
FIG. 6 is a flowchart illustrating a procedure of issuing conversion request of the first embodiment.
Figure 7:
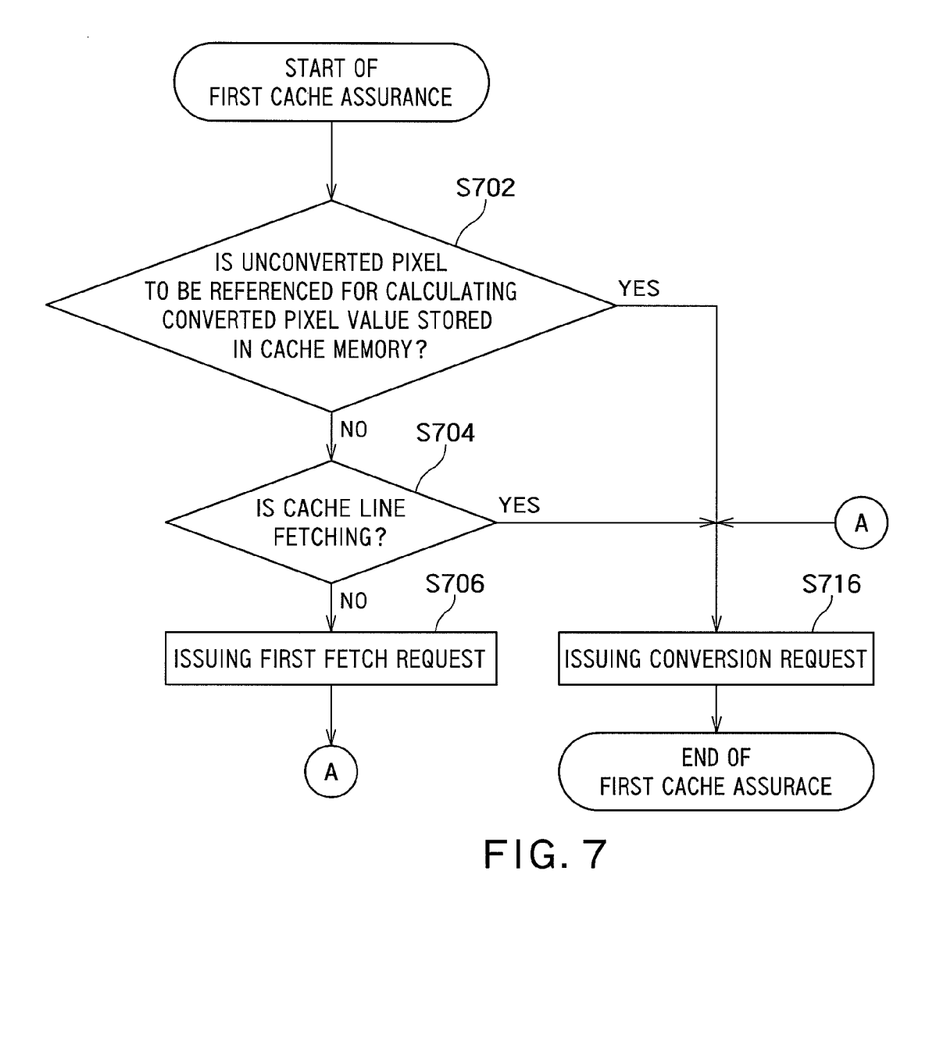
FIG. 7 is a flowchart illustrating a procedure of first cache assurance of the first embodiment.

Issuing conversion request of the first embodiment will be explained. FIG. 6 is a flowchart illustrating a procedure of issuing conversion request of the first embodiment. FIG. 7 is a flowchart illustrating a procedure of first cache assurance of the first embodiment. Issuing conversion request is a processing of issuing the conversion request including an unconverted coordinate and a converted coordinate. The first cache assurance is a processing of assuring that the unconverted pixel referred to in calculating the converted pixel value is stored in the cache memory 20 or the cache line CLi is being fetched during issuing conversion request.

<S601> The counter 11 determines whether the buffer 14 is full. When the buffer 14 is not full (NO in S601), the flow goes to S602. When the buffer 14 is full (YES in S601), the image processing apparatus is on standby until an empty area is secured in the buffer 14. That is, the flow goes to S602 when the empty area exists in the buffer 14.

<Determining converted coordinate (S602)> The counter 11 determines the converted coordinate according to a predetermined execution sequence. Because the converted coordinate corresponds to the address of the second area MA2 on one-on-one level, the address of the second area MA2, in which the converted pixel located at the determined converted coordinate should be stored, is determined when the converted coordinate is determined. The execution sequence depends on the conversion pattern. Specifically, the counter 11 obtains the conversion pattern through the input-output interface 40 and updates the converted coordinate value using a coordinate calculation algorithm corresponding to the obtained conversion pattern. That is, the converted coordinate is shifted according to the execution sequence (see FIG. 11A to FIG. 11H) in accordance with the conversion pattern.

<Calculating unconverted coordinate (S603)> The coordinate calculator 12 calculates the unconverted coordinate that is used to calculate the converted pixel value located at the converted coordinate determined in S602. The coordinate calculator 12 uses a conversion equation that obtains the unconverted coordinate from the converted coordinate corresponding to the conversion pattern. For example, for the conversion patterns such as rotation, reduction, enlargement, and translation, the coordinate calculator 12 calculates the unconverted coordinate using a conversion equation (see equation 1) corresponding to each conversion pattern and the converted coordinate. In the equation 1, X1 and Y1 are the unconverted coordinate, X2 and Y2 are the converted coordinate, and A to F are conversion parameters. As shown in the equation 1, the unconverted coordinate (X1,Y1) is determined when the converted coordinate (X2,Y2) is determined.

$$X1 = A*X2 + B*Y2 + C$$
$$Y1 = D*X2 + E*Y2 + F \quad \text{(Equation 1)}$$

<First cache assurance (S604)> The tag checker 13 confirms whether the unconverted pixel located at the unconverted coordinate calculated in S603 is stored in the cache memory 20. When the unconverted pixel is not stored in the cache memory 20, the tag checker 13 issues a fetch request. Then the tag checker 13 issues a conversion request to calculate the converted pixel value with reference to the unconverted pixel. The first cache assurance is executed according to the procedure of FIG. 7.

<S702> The tag checker 13 determines whether the unconverted pixel used to calculate the converted pixel value is stored in the cache memory 20 based on the tag of the tag area Ti. Specifically, when the unconverted coordinate calculated in S603 is not included between a head coordinate of a head pixel and an end coordinate of an end pixel in the pixel package PACj specified by the tag, the tag checker 13 determines that the unconverted pixel used to calculate the converted pixel value is not stored in the cache memory 20 (NO in S702), and the flow goes to S704. When the unconverted coordinate is included between the head coordinate and the end coordinate, the tag checker 13 determines that the unconverted pixel is stored in the cache memory 20 (YES in S702), and the flow goes to S716.

For example, the tag checker 13 executes S702 using equations 2 to 6. In the equations 2 to 6, n is the number of pixels included in one pixel package PAC, and w is the number of pixels in a horizontal direction in the unconverted image area. The tag checker 13 calculates a head coordinate (Xb,Yb) of a pixel package PACj using the equations 2 and 3, and calculates an end coordinate (Xe,Ye) of a pixel package PACj using the equations 4 and 5. The equation 2 means that Xb is a remainder when (j−1)×n is divided by w. The equation 4 means that Xe is a remainder when j×n is divided by w. In the equations 3 and 5, a right side is rounded down (that is, the left side is an integer). Then the tag checker 13 determines the unconverted pixel is stored in the cache memory 20 when the equation 6 holds.

$$Xb = (j-1) \times n \% w \quad \text{(Equation 2)}$$
$$Yb = (j-1) \times n \div w \quad \text{(Equation 3)}$$
$$Xe = j \times n \% w \quad \text{(Equation 4)}$$
$$Ye = j \times n \div w \quad \text{(Equation 5)}$$
$$Ya \times w + Xa \leq Y \times w + X$$
$$Y \times w + X \leq Ye \times w + Xe \quad \text{(Equation 6)}$$

<S704> The tag checker 13 determines whether the cache line CLi is being fetched based on cache line information on the tag area Ti. When the cache line CLi is not being fetched (NO in S704), the flow goes to S706. When the cache line CLi is being fetched (YES in S704), the flow goes to S716.

<Issuing first fetch request (S706)> The tag checker 13 issues a first fetch request. In the first fetch request, the cache line is requested to be updated to a fetching state, and the external memory 30 is requested to transfer the pixel package PACj stored in the first area MA1 to the cache memory 20. Therefore, the new unconverted pixel is stored in the cache memory 20 after access to the external memory 30. When issuing the first fetch request, the tag checker 13 executes S716 without waiting for the end of the access to the external memory 30.

<Issuing conversion request (S716)> The tag checker 13 issues a conversion request. The conversion request includes the converted coordinate determined in S602 and the unconverted coordinate calculated in S603. In the conversion request, the converted pixel value located at the converted coordinate is requested to be calculated by referring to the unconverted coordinate. Then the tag checker 13 writes the issued conversion request into the buffer 14. The buffer 14 stores the conversion request until the pixel referring module 15 reads the conversion request. After S716, the first cache assurance is ended, and the flow goes to S605.

<S605> S601 to S604 are repeatedly executed until the first cache assurance is completed for all the unconverted pixels (NO in S605). When the first cache assurance is completed for all the unconverted pixels (YES in S605), issuing conversion request is ended, and the flow goes to S504.

Figure 8:
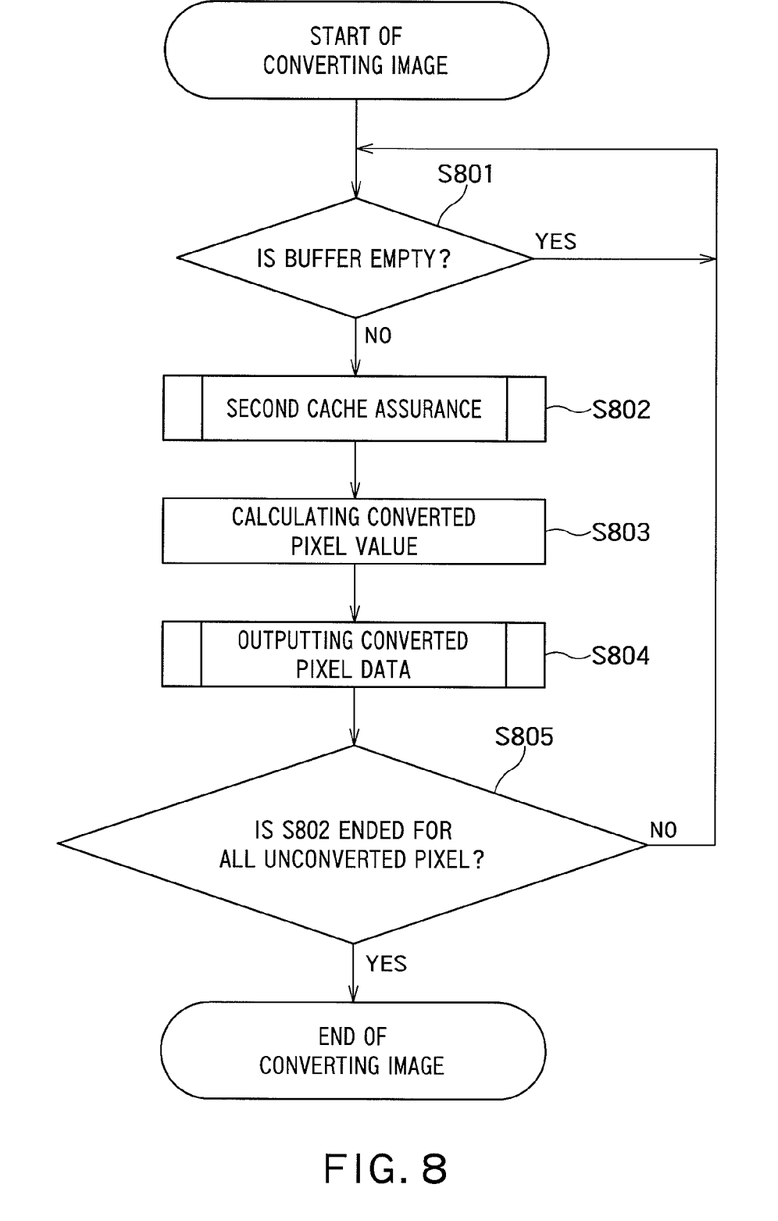
FIG. 8 is a flowchart illustrating a procedure of converting image of the first embodiment.
Figure 9:
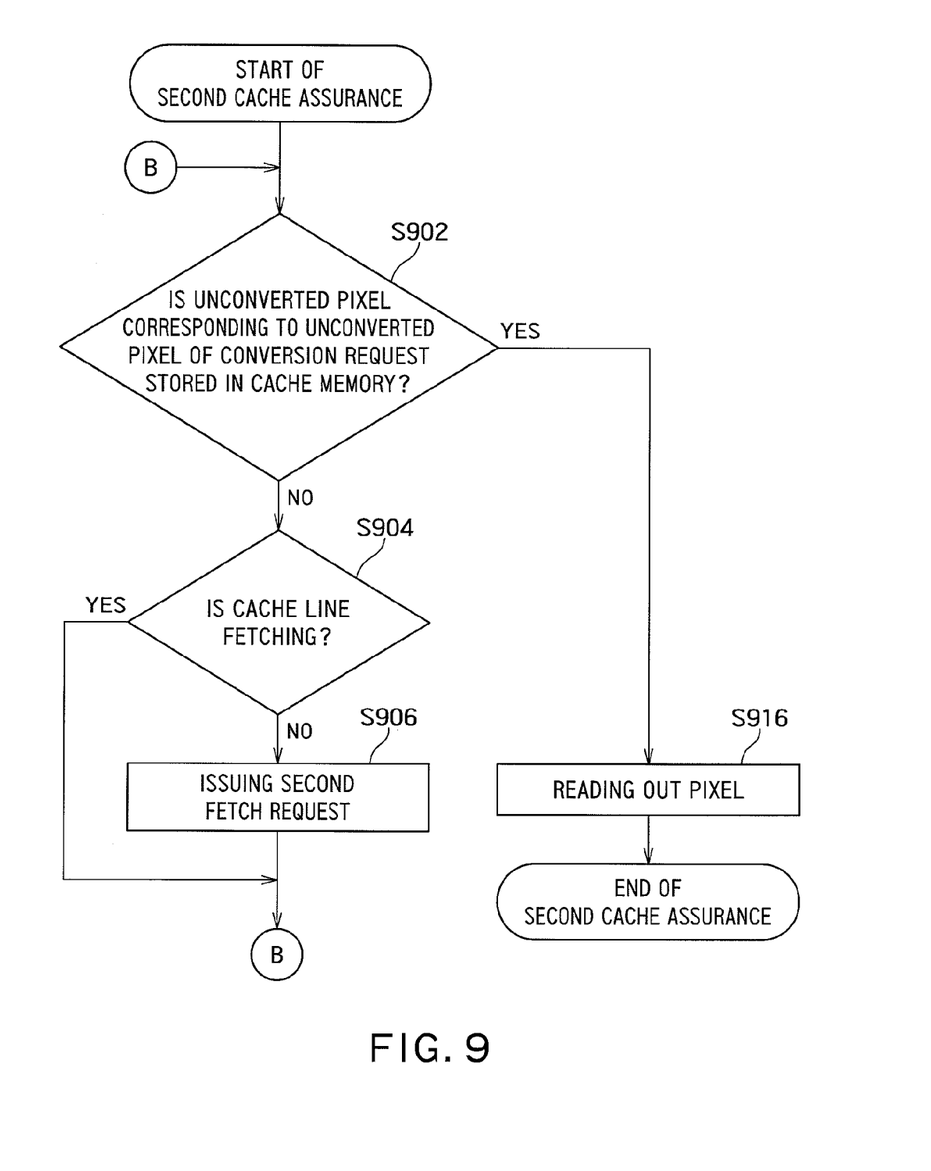
FIG. 9 is a flowchart illustrating a procedure of second cache assurance of the first embodiment.

Converting image of the first embodiment will be explained below. FIG. 8 is a flowchart illustrating a procedure of converting image of the first embodiment. FIG. 9 is a flowchart illustrating a procedure of second cache assurance of the first embodiment. Converting image is a processing of calculating the converted pixel value by referring to the unconverted pixel stored in the cache memory 20. The second cache assurance is a processing of assuring that the unconverted pixel used to calculate the converted pixel value is stored in the cache memory 20 during converting image.

<S801> When the buffer 14 is not empty (that is, there is a request in the buffer 14) (NO in S801), the flow goes to S802. When the buffer 14 is empty (that is, there is no request in the buffer 14) (YES in S801), the flow goes to S802 after the buffer 14 is not empty. That is, the flow goes to S802 when at least one request is made to the buffer 14.

<Second cache assurance (S802)> The pixel referring module 15 reads the unconverted pixel, which is located at the unconverted coordinate in the conversion request stored in the buffer 14 in the first cache assurance, from the cache memory 20. The second cache assurance is executed according to the procedure of FIG. 9.

<S902> The pixel referring module 15 determines whether the unconverted pixel, which is located at the unconverted coordinate of the conversion request stored in the buffer 14 in the first cache assurance, is stored in the cache memory 20 based on the tag. Specifically, when the unconverted coordinate in the conversion request is not included between the head coordinate and the end coordinate, the pixel referring module 15 determines that the unconverted pixel located at the unconverted coordinate is not stored in the cache memory 20 (NO in S902), and the flow goes to S904. When the unconverted coordinate is included between the head coordinate and the end coordinate, the pixel referring module 15 determines that the unconverted pixel located at the unconverted coordinate is stored in the cache memory 20 (YES in S902), and the flow goes to S916.

<S904> The pixel referring module 15 determines whether the cache line CLi is being fetched based on the cache line information. When the cache line CLi is not being fetched (NO in S906), the flow goes to S906. When the cache line CLi is being fetched (YES in S906), the flow returns to S902.

<Second fetch request (S906)> The pixel referring module 15 issues a second fetch request. In the second fetch request, the external memory 30 is requested to transfer the pixel package PACj stored in the first area MA1 to the cache memory 20. Therefore, the new unconverted pixel is stored in the cache memory 20. After S906, the flow returns to S902.

<Reading out pixel (S916)> The pixel referring module 15 reads out the unconverted pixel from the cache memory 20. Specifically, the pixel referring module 15 reads out the unconverted pixel located at the unconverted coordinate in the conversion request in the pixel package PACj stored in the cache line CLi. After S916, the second cache assurance is ended, and the flow goes to S803.

<Calculating converted pixel value (S803)> The pixel value calculator 16 calculates the converted pixel value by referring to the unconverted pixel read out from the cache memory 20. Specifically, the pixel value calculator 16 obtains the conversion pattern through the input-output interface 40 and refers to read-out unconverted pixel to calculate the converted pixel value using a pixel value calculation algorithm corresponding to the obtained conversion pattern.

<Outputting converted pixel (S804)> The outputting module 17 writes the converted pixel having the converted pixel value calculated in S803 into the external memory 30. Specifically, the outputting module 17 writes the converted pixel into the address of the second area MA2 corresponding to the converted coordinate in the conversion request stored in the buffer 14.

<S805> S801 to S804 are repeatedly executed until the second cache assurance is completed for all the unconverted pixels (NO in S805). When the second cache assurance is completed for all the unconverted pixels (YES in S805), converting image is ended, and the flow goes to S504.

According to the first embodiment, the unconverted pixel to be referred to in calculating the converted pixel value is stored in the cache memory before the converted pixel value is calculated. As a result, the access to the external memory 30 is eliminated, so that the use efficiency of the cache memory 20 and the latency of the access to the external memory 30 can be improved.

Second Embodiment

A second embodiment will be explained below. In the second embodiment, by way of example, the converted coordinate is determined according to the conversion pattern when the converted coordinate is determined. The description similar to that of the first embodiment is not repeated here.

Figure 10:
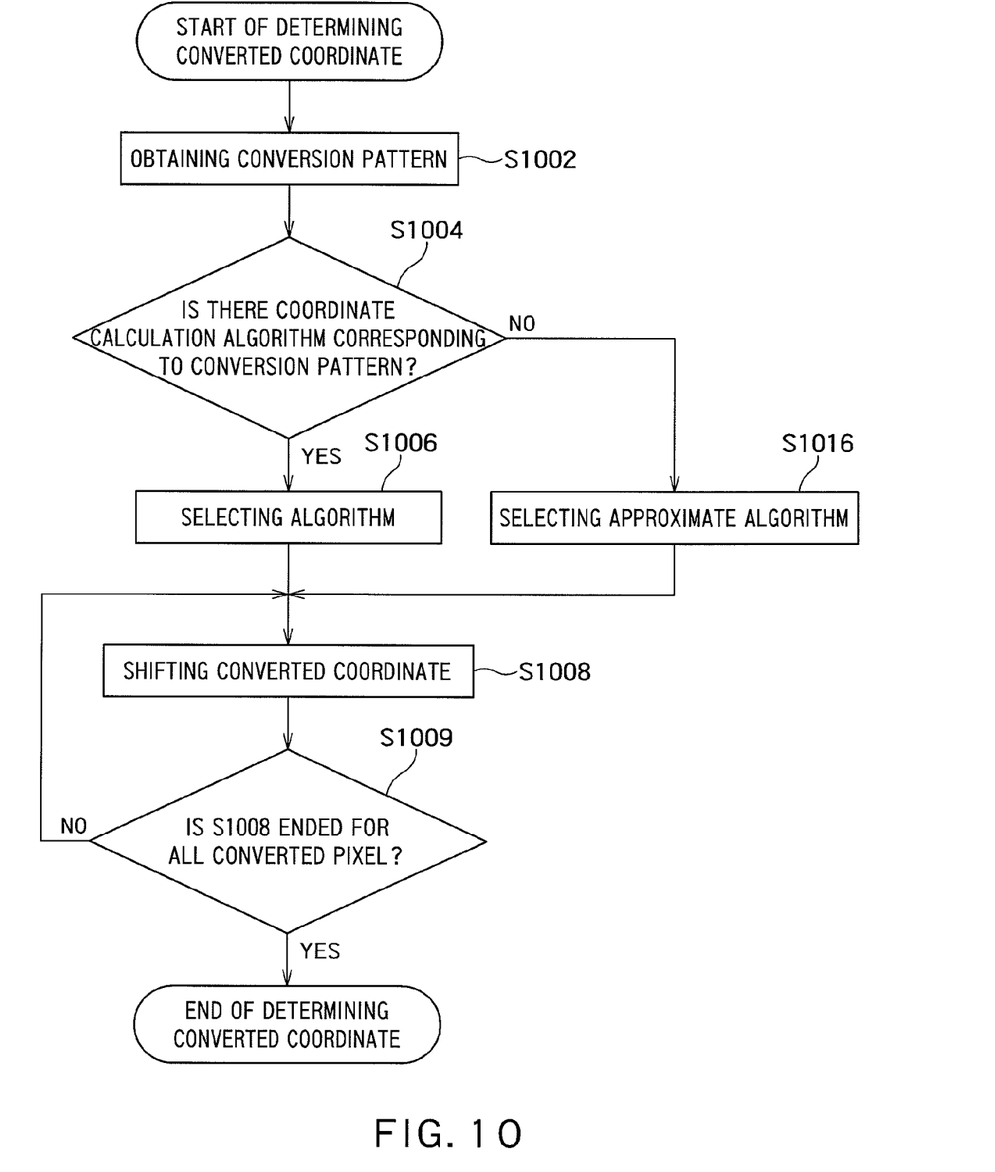
FIG. 10 is a flowchart illustrating a procedure of determining converted coordinate of the second embodiment.
Figure 11:
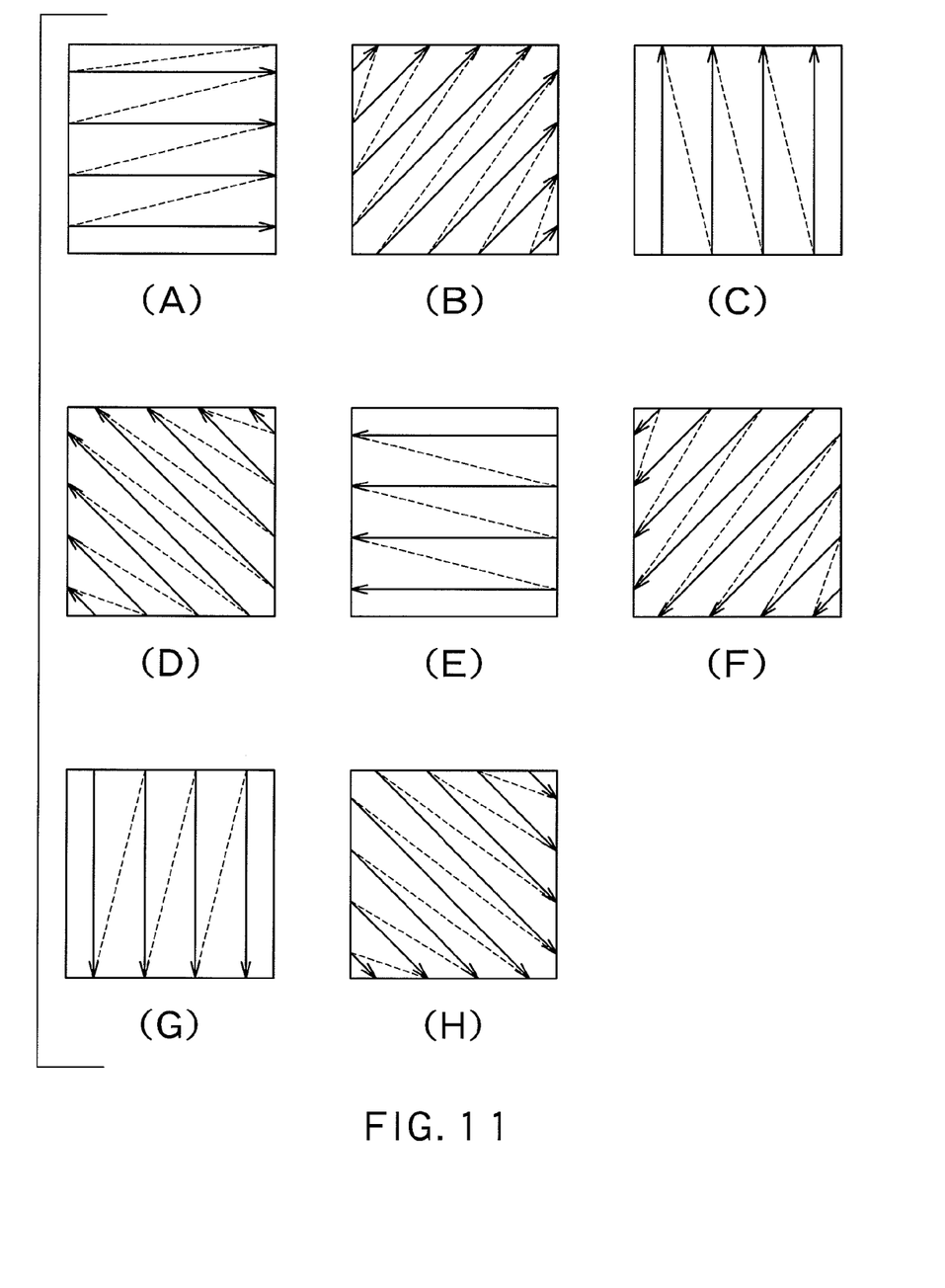
FIGS. 11A to 11H are schematic diagrams illustrating an execution sequence in each conversion pattern.

An operation of an image processing apparatus of the second embodiment will be explained. FIG. 10 is a flowchart illustrating a procedure of determining converted coordinate of the second embodiment. FIG. 11 is a schematic diagram illustrating an execution sequence in each conversion pattern. Determining converted coordinate of the second embodiment is a processing executed by the counter 11. That is, determining converted coordinate of the second embodiment is executed when the buffer 14 is empty.

<Obtaining conversion pattern (S1002)> The counter 11 obtains the conversion pattern supplied from the image generating apparatus 60 through the input-output interface 40. For example, the conversion pattern is information indicating a pattern in which an image is rotated by an arbitrary angle, and the conversion pattern is determined by a user who uses the image generating apparatus 60 or an application that implements the function of the image generating apparatus 60.

<S1004> The counter 11 determines whether a coordinate calculation algorithm corresponding to the obtained conversion pattern exists. For example, plural coordinate calculation algorithms are stored in the internal memory of the counter 11. Each coordinate calculation algorithm indicates the execution sequence of the predetermined conversion pattern illustrated in FIG. 11. FIG. 11A illustrates an execution sequence of raster scan, FIG. 11B illustrates an execution sequence of 45° rotation, FIG. 11C illustrates an execution sequence of 90° rotation, FIG. 11D illustrates an execution sequence of 135° rotation, FIG. 11E illustrates an execution sequence of 180° rotation, FIG. 11F illustrates an execution sequence of 225° rotation, FIG. 11G illustrates an execution sequence of 270° rotation, and FIG. 11H illustrates an execution sequence of 315° rotation. When the coordinate calculation algorithm corresponding to the obtained conversion pattern exists (YES in S1004), the flow goes to S1006. When the coordinate calculation algorithm corresponding to the obtained conversion pattern does not exist (NO in S1004), the flow goes to S1016.

<Selecting algorithm (S1006)> The counter 11 selects the coordinate calculation algorithm corresponding to the obtained conversion pattern from the plural coordinate calculation algorithms. For example, the coordinate calculation algorithm indicating the execution sequence of the 45° rotation of FIG. 11B is selected when the obtained conversion pattern is the 45° rotation.

<Selecting approximate algorithm (S1016)> The counter 11 selects the coordinate calculation algorithm (that is, the coordinate calculation algorithm indicating the execution sequence closest to the execution sequence of the obtained conversion pattern) corresponding to the conversion pattern closest to the obtained conversion pattern from the plural coordinate calculation algorithms. For example, the coordinate calculation algorithm indicating the execution sequence of the 90° rotation of FIG. 11C is selected when the obtained conversion pattern is the 100° rotation.

<Shifting converted coordinate (S1008)> The counter 11 determines the converted coordinate according to the coordinate calculation algorithm selected in S1006 or S1016. Specifically, the counter 11 updates the converted coordinate value using the selected coordinate calculation algorithm. The converted coordinate is shifted according to the execution sequence that is matched with or approximate to the conversion pattern.

<S1009> S1008 is repeatedly executed until S1008 is completed for all the converted coordinates (NO in S1009). When S1008 is completed for all the converted coordinates (YES in S1009), the flow goes to S603. S603 to S605 are similar to those of the first embodiment.

In the second embodiment, the image generating apparatus 60 may select the coordinate calculation algorithm. In such cases, the plural coordinate calculation algorithms are previously stored in the internal memory of the image generating apparatus 60. The image generating apparatus 60 selects the coordinate calculation algorithm corresponding to the conversion pattern and supplies the coordinate calculation algorithm and the image data to the image processing apparatus 10. In S1002, the counter 11 obtains the coordinate calculation algorithm in addition to the conversion pattern that is supplied from the image generating apparatus 60 through the input-output interface 40. At this point, S1004, S1006, and S1016 are omitted.

According to the second embodiment, the converted coordinate is determined using the coordinate calculation algorithm that is selected according to the conversion pattern. Therefore, the unconverted pixel is stored in the cache memory 20 according to the execution sequence that is matched with or approximate to the conversion pattern. As a result, a probability that the unconverted pixel used to calculate a certain converted pixel is already stored in the cache memory 20 increases when the preceding converted pixel is calculated. Therefore, the use efficiency of the cache memory 20 and the latency of the access to the external memory 30 can be improved better than those of the first embodiment. Particularly the second embodiment is effectively suitable to the case where the converted pixel value needs to be calculated by referring to the plural unconverted pixels including peripheral pixels (for example, in the case of the 100° rotation).

Third Embodiment

A third embodiment will be explained below. In the third embodiment, by way of example, the converted coordinate is determined in predetermined block unit when the converted coordinate is determined. The description similar to that of the embodiments is not repeated here.

Figure 12:
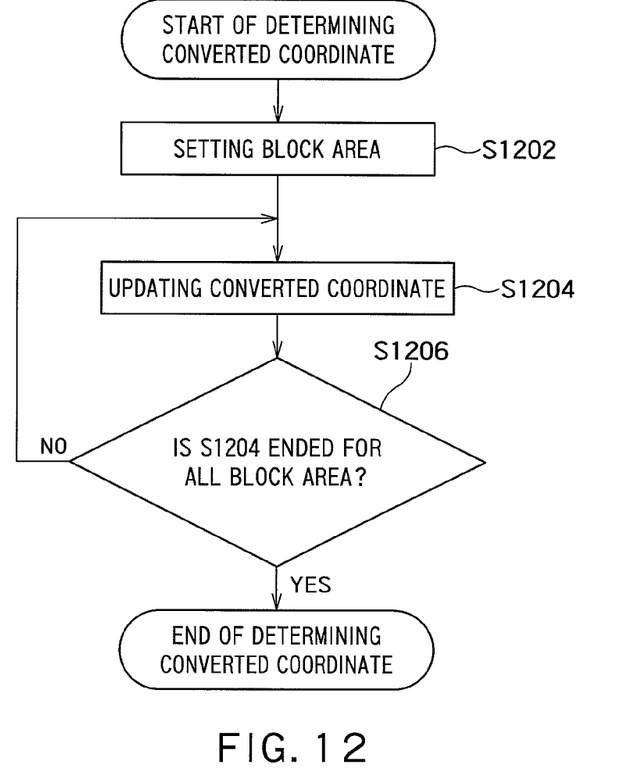
FIG. 12 is a flowchart illustrating a procedure of determining converted coordinate of the third embodiment.
Figure 13:
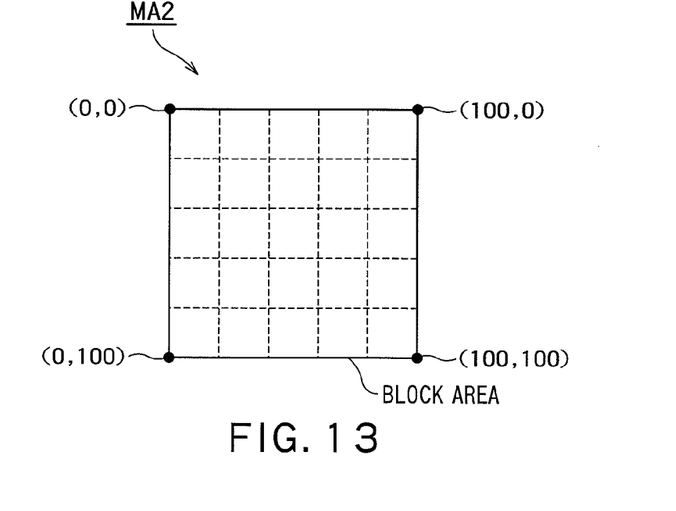
FIG. 13 is a schematic diagram of a block area of the third embodiment.

An operation of an image processing apparatus of the third embodiment will be explained. FIG. 12 is a flowchart illustrating a procedure of determining converted coordinate of the third embodiment. FIG. 13 is a schematic diagram of a block area of the third embodiment.

<Setting block area (S1202)> The counter 11 sets plural block areas to the second area MA2. Each block area is a rectangular area defined by a start point which is an arbitrary point in the second area MA2, and vertical and horizontal sizes corresponding to the cache line size of the cache memory 20. In each block area, converted pixels located in the rectangular area are stored. As illustrated in FIG. 13, for example, the block area is part of the second area MA2, in which the converted pixels located in the 100-by-100 rectangular area corresponding to the cache line size of 100 are stored on the basis of a point (0,0) as the start point.

<Updating converted coordinate (S1204)> The counter 11 determines the converted coordinate according to a predetermined execution sequence in each block area set in S1202. That is, the counter 11 determines the converted coordinate according to the predetermined execution sequence not in the whole of the image data but in each block area.

<S1206> S1204 is repeatedly executed until updating converted coordinate is completed for all the set block areas (NO in S1206). When updating converted coordinate is completed for all the set block areas (YES in S1206), the flow goes to S603. S603 to S605 are executed in each block area.

Figure 14:
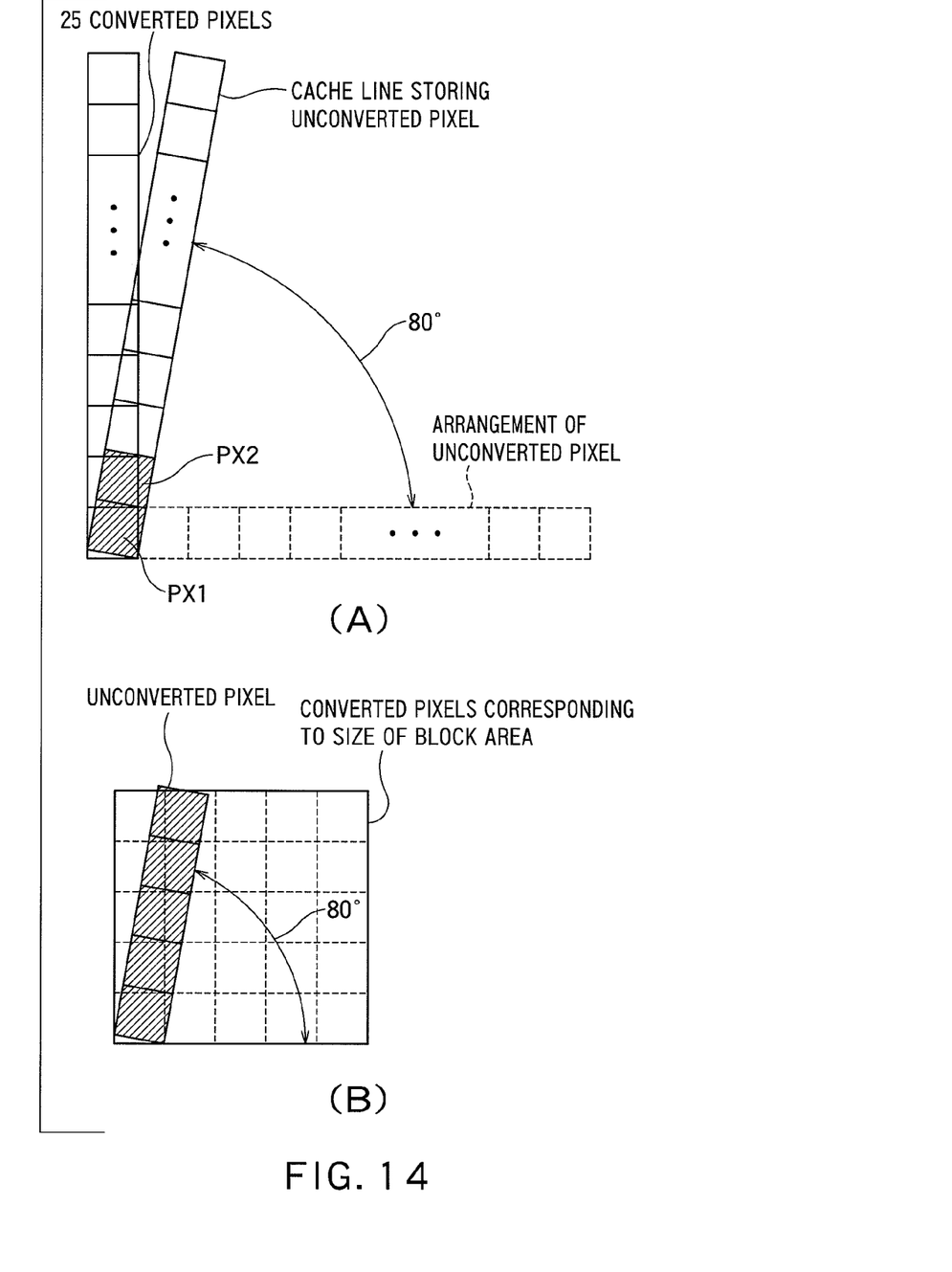
FIGS. 14A and 14B illustrate schematic diagrams illustrating an action effect of the third embodiment.

An action effect of the third embodiment will be explained. FIG. 14 is a schematic diagram illustrating the action effect of the third embodiment. FIG. 14 illustrates an example in which an image is rotated by a rotation angle (80°) that is not matched with the conversion pattern corresponding to the execution sequence of FIG. 11. FIG. 14A illustrates an example in which 25 pixels are converted by the execution sequence of FIG. 11C irrespective of the block area, and FIG. 14B illustrates an example in which consecutive 25 pixels are converted in the block area.

In the conventional technology, the unconverted pixel is transferred to the cache memory 20 in cache line size unit (that is, in pixel package unit). However, for the 80° rotation illustrated in FIG. 14A, only part (pixels PX1 and PX2) of the unconverted pixel is referred to in converting the consecutive 25 pixels of FIG. 14A when the converted pixel value is calculated.

On the other hand, in the third embodiment, unconverted pixels (pixels PX1 to PX5) in the pixel package, which are referred to in converting the consecutive 25 pixels in the block area, are more than those of the conventional technology. That is, in the third embodiment (FIG. 14B), the use efficiency of the data in cache line size unit stored in the cache memory 20 becomes higher than that of the conventional technology (FIG. 14A).

According to the third embodiment, the converted coordinate is determined in each block area, and processing is executed in each block area after the converted coordinate is determined. As a result, calculating converted pixel value is executed while the unconverted pixel referred to in calculating the converted pixel value is stored in the cache memory 20 (that is, before the unconverted pixel stored in the cache memory 20 is deleted). Therefore, the use efficiency of the cache memory 20 and the latency of the access to the external memory 30 are improved better than those of the first embodiment. Particularly the third embodiment is effectively suitable to the case where the converted pixel value is calculated by referring to the plural unconverted pixels.

The third embodiment may be combined with the second embodiment. In such cases, S1202, S1002 to S1006, and S1016 are randomly executed. Therefore, the use efficiency of the cache memory 20 and the latency of the access to the external memory 30 can be improved better than those of the second embodiment.

The second and third embodiments may be independent of the first embodiment. In such cases, after determining converted coordinate of FIG. 10 or FIG. 12, the converted pixel value is calculated by referring to the unconverted pixel as is conventionally done.

In the second or third embodiment, the first cache assurance may be omitted after determining converted coordinate. That is, calculating unconverted coordinate is executed after determining converted coordinate of FIG. 10 or FIG. 12 is completed. At this point, the tag checker 13 and the buffer 14 can be eliminated.

At least a portion of an image processing apparatus according to the above-described embodiments may be composed of hardware or software. When at least a portion of the image processing apparatus is composed of software, a program for executing at least some functions of the image processing apparatus may be stored in a recording medium, such as a flexible disk or a CD-ROM, and a computer may read and execute the program. The recording medium is not limited to a removable recording medium, such as a magnetic disk or an optical disk, but it may be a fixed recording medium, such as a hard disk or a memory.

In addition, the program for executing at least some functions of the image processing apparatus according to the above-described embodiment may be distributed through a communication line (which includes wireless communication) such as the Internet. In addition, the program may be encoded, modulated, or compressed and then distributed by wired communication or wireless communication such as the Internet. Alternatively, the program may be stored in a recording medium, and the recording medium having the program stored therein may be distributed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An image processing apparatus connected to an external memory and a cache memory, the apparatus comprising:
- a counter configured to determine a converted coordinate according to a predetermined execution sequence;
- a coordinate calculator configured to calculate a unconverted coordinate used to calculate a converted pixel value located at the converted coordinate;
- a tag checker configured to generate a conversion request to calculate the converted pixel value with reference to an unconverted pixel located at the unconverted coordinate;
- a pixel referring module configured to read the unconverted pixel from the cache memory based on the conversion request when the unconverted pixel is stored in the cache memory;
- a pixel value calculator configured to calculate the converted pixel value with reference to the read unconverted pixel; and
- an outputting module configured to write the converted pixel having the calculated converted pixel value into the external memory.

2. The apparatus of claim 1, wherein the tag checker determines whether the unconverted pixel is stored in the cache memory or not based on a tag of the cache memory, and generates the conversion request when the unconverted pixel is stored in the cache memory.

3. The apparatus of claim 2, wherein when the unconverted pixel is not stored in the cache memory, the tag checker determines whether a cache line in the cache memory is being fetched or not based on cache line information of the cache memory, and issues a first fetch request when the cache line is not being fetched.

4. The apparatus of claim 3, wherein the tag checker determines that the unconverted pixel is stored in the cache memory when the unconverted coordinate is between a head coordinate identified by the tag and a end coordinate, the end coordinate identified by the head coordinate and a cache line size of the cache memory.

5. The apparatus of claim 1, wherein the pixel referring module determines whether the unconverted pixel is stored in the cache memory or not based on a tag of the cache memory.

6. The apparatus of claim 5, wherein the pixel referring module determines whether a cache line in the cache memory is being fetched or not based on cache line information of the cache memory, and issues a second fetch request when the cache line is not being fetched.

7. The apparatus of claim 1, further comprising a buffer configured to store the conversion request,
wherein the counter determines the converted coordinate when the buffer is not full.

8. The apparatus of claim 1, wherein the counter comprises a plurality of coordinate calculation algorithms used to calculate the converted coordinate, and determines the converted coordinate according to an execution sequence indicated in the coordinate calculation algorithm corresponding to a conversion pattern.

9. The apparatus of claim 8, wherein when the counter does not comprise the coordinate calculation algorithm corresponding to the conversion pattern, the counter selects one of the coordinate calculation algorithms, the selected algorithm corresponding to a pattern closest to the conversion pattern.

10. The apparatus of claim 1, wherein the counter sets a plurality of block areas to an area of the external memory in which the converted pixel is stored and determines the converted coordinate in each block area.

11. The apparatus of claim 10, wherein a size of the block area is equal to a cache line size of the cache memory.

12. An image processing system comprising:
- an external memory configured to store image data comprising a plurality of pixels;
- a cache memory configured to store an unconverted pixel;
- a counter configured to determine a converted coordinate according to a predetermined execution sequence;
- a coordinate calculator configured to calculate a unconverted coordinate used to calculate a converted pixel value located at the converted coordinate;
- a tag checker configured to generate a conversion request to calculate the converted pixel value with reference to an unconverted pixel located at the unconverted coordinate;
- a pixel referring module configured to read the unconverted pixel from the cache memory based on the conversion request when the unconverted pixel is stored in the cache memory;
- a pixel value calculator configured to calculate the converted pixel value with reference to the read unconverted pixel; and
- an outputting module configured to write the converted pixel having the calculated converted pixel value into the external memory.

13. The system of claim 12, wherein the tag checker determines whether the unconverted pixel is stored in the cache memory or not based on a tag of the cache memory, and generates the conversion request when the unconverted pixel is stored in the cache memory.

14. The system of claim 13, wherein when the unconverted pixel is not stored in the cache memory, the tag checker determines whether a cache line in the cache memory is being fetched or not based on cache line information of the cache memory, and issues a first fetch request when the cache line is not being fetched.

15. The system of claim 14, wherein the tag checker determines that the unconverted pixel is stored in the cache memory when the unconverted coordinate is between a head coordinate identified by the tag and a end coordinate, the end coordinate identified by the head coordinate and a cache line size of the cache memory.

16. The system of claim 12, wherein the pixel referring module determines whether the unconverted pixel is stored in the cache memory or not based on a tag of the cache memory.

17. The system of claim 16, wherein the pixel referring module determines whether a cache line in the cache memory is being fetched or not based on cache line information of the cache memory, and issues a second fetch request when the cache line is not being fetched.

18. The system of claim 12, further comprising a buffer configured to store the conversion request,
wherein the counter determines the converted coordinate when the buffer is not full.

19. The system of claim 12, wherein the counter comprises a plurality of coordinate calculation algorithms used to calculate the converted coordinate, and determines the converted coordinate according to an execution sequence indicated in the coordinate calculation algorithm corresponding to a conversion pattern.

20. The system of claim 19, wherein when the counter does not comprise the coordinate calculation algorithm corresponding to the conversion pattern, the counter selects one of the coordinate calculation algorithms, the selected algorithm corresponding to a pattern closest to the conversion pattern.

* * * * *